(12) United States Patent
Hou et al.

(10) Patent No.: US 11,385,377 B2
(45) Date of Patent: Jul. 12, 2022

(54) SHIELDING STRUCTURE OF SAFETY INSPECTION EQUIPMENT AND SAFETY INSPECTION CHANNEL

(71) Applicant: Nuctech Company Limited, Beijing (CN)

(72) Inventors: Hongbin Hou, Beijing (CN); Mingzhi Hong, Beijing (CN); Jinning Liang, Beijing (CN); Qingping Huang, Beijing (CN); Xin Jin, Beijing (CN)

(73) Assignee: Nuctech Company Limited, Beijing (CN)

( * ) Notice: Subject to any disclaimer, the term of this patent is extended or adjusted under 35 U.S.C. 154(b) by 226 days.

(21) Appl. No.: 16/627,426

(22) PCT Filed: May 29, 2019

(86) PCT No.: PCT/CN2019/089048
§ 371 (c)(1),
(2) Date: Dec. 30, 2019

(87) PCT Pub. No.: WO2020/010953
PCT Pub. Date: Jan. 16, 2020

(65) Prior Publication Data
US 2021/0333430 A1    Oct. 28, 2021

(30) Foreign Application Priority Data
Jul. 12, 2018   (CN) .......................... 201810761941.5

(51) Int. Cl.
  *G01V 5/00*    (2006.01)
  *G21F 1/12*    (2006.01)
  (Continued)

(52) U.S. Cl.
  CPC ................ *G01V 5/005* (2013.01); *B32B 1/08* (2013.01); *B32B 25/02* (2013.01); *B32B 27/12* (2013.01);
  (Continued)

(58) Field of Classification Search
  CPC ..... B32B 1/08; B32B 27/40; B32B 2262/106; G21F 1/12; G01V 5/005
  See application file for complete search history.

(56) References Cited

U.S. PATENT DOCUMENTS 3,737,661 A * 6/1973 Applegate ................ G21K 1/02
                                                            378/59
3,897,345 A   7/1975 Foster
(Continued)

FOREIGN PATENT DOCUMENTS

CN    102596043 A    7/2012
CN    103106937 A    5/2013
(Continued)

OTHER PUBLICATIONS

Canadian Examination Report dated Feb. 18, 2021 received in Canadian Application No. 3,066,392.
(Continued)

*Primary Examiner* — Joanna Pleszczynska
(74) *Attorney, Agent, or Firm* — Scully Scott Murphy & Presser

(57) ABSTRACT

A shielding structure of the safety inspection equipment includes a first carbon fiber layer, a polyurethane layer and a second carbon fiber layer, which are sequentially stacked to be configured as a shielding channel with two opened ends. The second carbon fiber layer is an outer layer of the shielding channel. The first carbon fiber layer and the second carbon fiber layer are made of carbon fiber materials. The polyurethane layer is made of polyurethane materials.

16 Claims, 4 Drawing Sheets

(51) Int. Cl.
*B32B 1/08* (2006.01)
*B32B 27/12* (2006.01)
*B32B 27/40* (2006.01)
*B32B 25/02* (2006.01)

(52) U.S. Cl.
CPC .......... *B32B 27/40* (2013.01); *B32B 2255/02* (2013.01); *B32B 2262/0261* (2013.01); *B32B 2262/106* (2013.01)

(56) References Cited

U.S. PATENT DOCUMENTS

| | | | |
|---|---|---|---|
| 7,476,889 B2* | 1/2009 | DeMeo | G01V 5/0008 250/516.1 |
| 7,484,253 B1 | 2/2009 | Coppens | |
| 2008/0304622 A1* | 12/2008 | Morton | G01T 1/246 378/51 |
| 2010/0310054 A1 | 12/2010 | Westerlund | |
| 2018/0000432 A1* | 1/2018 | Pruyne | A61B 6/032 |

FOREIGN PATENT DOCUMENTS

| | | |
|---|---|---|
| CN | 104325756 A | 2/2015 |
| CN | 204257218 U | 4/2015 |
| CN | 205959627 U | 2/2017 |
| CN | 206201589 U | 5/2017 |
| CN | 206346423 U | 7/2017 |
| CN | 108614303 A | 10/2018 |
| CN | 208506272 U | 2/2019 |
| FR | 2 527 920 A1 | 12/1983 |
| JP | 60-82296 U | 6/1985 |
| JP | 62-152839 A | 7/1987 |
| JP | 06-51095 A | 2/1994 |
| JP | 2009-160390 A | 7/2009 |
| JP | 2012-93264 A | 5/2012 |
| JP | 2013-501859 A | 1/2013 |
| JP | 2013-226792 A | 11/2013 |
| WO | 2016/002456 A1 | 1/2016 |

OTHER PUBLICATIONS

European Extended Supplementary Search Report dated Mar. 23, 2021 received in European Application No. 19 823 761.2.

* cited by examiner

SHIELDING STRUCTURE OF SAFETY INSPECTION EQUIPMENT AND SAFETY INSPECTION CHANNEL

CROSS-REFERENCE TO RELATED APPLICATIONS

This disclosure is based on International Application No. PCT/CN2019/089048, filed on May 29, 2019, which is based on and claims priority to the Chinese patent application No. 2018107619415 filed on Jul. 12, 2018, the entire contents of which are hereby incorporated by reference.

TECHNICAL FIELD

The present disclosure relates to fields of safety inspection equipment, in particular to a shielding structure of safety inspection equipment and a safety inspection channel.

BACKGROUND

At present, a channel carbon fiber shielding structure of a CT imaging system of major security inspection equipment is formed by carbon fiber layers. The carbon fiber layer can be configured to be a single-layer, double-layer and multi-layer.

The single-layer carbon fiber shielding structure (i.e., including a single-layer carbon fiber layer) has a thickness of about 0.2-0.3 mm, advantage of having little influence on imaging quality. But the single-layer carbon fiber shielding structure has poor rigidity to easily collapse when luggage passes through it, and has a poor wear resistance.

The double-layer carbon fiber shielding structure (i.e., including two layers of the carbon fiber layers) has a thickness of about 0.5 mm, with an advantage of having less influence on the imaging quality and better rigidity than the single-layer carbon fiber shielding structure. But the double-layer carbon fiber shielding structure has a rigidity not to satisfy occasions with a wider beam surface, and has a poor wear resistance.

The multi-layer carbon fiber shielding structure (i.e., including more than two layers of the carbon fiber layers) has different thicknesses according to different layers of the carbon fiber. The more the layers, the greater the thickness, correspondingly the better the rigidity, and thereby can be applied to the occasions with the wider beam surfaces. However, as the carbon fiber layers increase, the influence on the imaging quality is greater to cause the imaging quality poorer and the wear resistance bad. In addition, cost of the carbon fiber is calculated based on per square meter of the single-layer, so that as the number of carbon fiber layers increases, the cost can be multiply increased.

Generally, the thinner the carbon fiber shielding plate, the better the impact on the imaging quality. However, in view of the rigidity of the carbon fiber plate, the carbon fiber shielding plate is better to be thicker.

In addition, the shielding structure and the channel structure of major security inspection equipment are installed by pressing plates, and there are steps between the pressing plate and the shielding layer, on which dust or sundries are easy to be accumulated, and thus affecting imaging.

Thus, it would be an urgent problem in the art to improve the rigidity of the shielding structure on the premise of reducing the impact on the imaging quality.

SUMMARY

The present disclosure provides a shielding structure of the safety inspection equipment, including a shielding body, wherein the shielding body includes a first carbon fiber layer, a polyurethane layer and a second carbon fiber layer sequentially, which are stacked to be configured as a shielding channel with two opened ends; the second carbon fiber layer is an outer layer of the shielding channel; the first carbon fiber layer and the second carbon fiber layer are made of carbon fiber materials; and the polyurethane layer is made of polyurethane materials.

In other aspect of the present disclosure, a safety inspection channel of a safety inspection equipment is further provided. The safety inspection channel includes two channel structures and the aforesaid shielding structure, wherein two channel structures are respectively connected and communicated with both ends of the shielding channel to form a through safety inspection channel.

DETAILED DESCRIPTION

Now, the exemplary implementations will be described more completely with reference to the accompanying drawings. However, the exemplary implementations can be done in various forms and should not be construed as limiting the implementations as set forth herein. Instead, these implementations are provided so that this disclosure will be thorough and complete, and concept of the exemplary implementation will be fully conveyed to those skilled in the art. In the figures, for sake of clarity, thickness of the areas and layers may be exaggerated. Same reference numbers denote the same or similar structures in the figures, and thus the detailed description thereof will be omitted Furthermore, the features, structures, or characteristics may be combined in one or more exemplary implementations in any proper manner. Hereinafter, plenty of specific details are set forth in order to facilitate fully understanding the exemplary implementations of the present disclosure. It is aware that those skilled in the art may carry out the technical solutions of the present disclosure even through one or more of the special details are omitted, or by employing other methods, components, and steps, etc. In other instances, the well-known structures, methods, implementations, or operations are not shown or described in detail to avoid obscuring aspects of the present disclosure.

Figure 1:
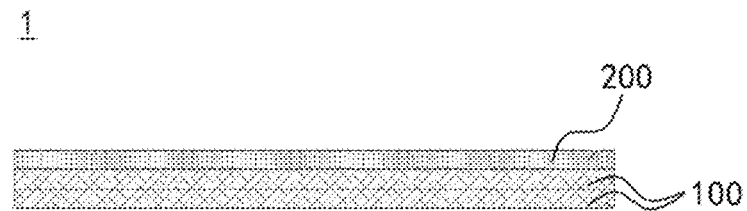
FIG. 1 is a schematic cross-sectional view of a shielding structure in related art.
Figure 2:
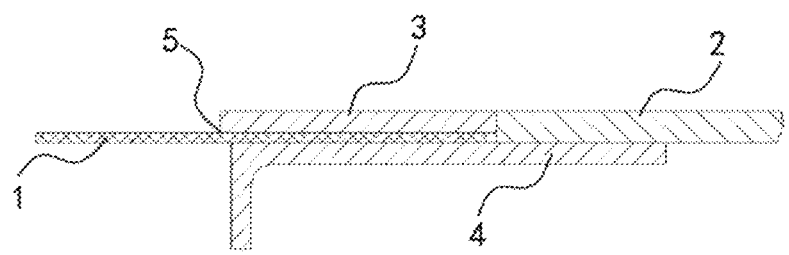
FIG. 2 is a schematic cross-sectional view of a connecting portion of a safety inspection channel in a related art.

As shown in FIGS. 1 and 2, FIG. 1 is a schematic cross-sectional view of a shielding structure in the related arts, and FIG. 2 is a schematic cross-sectional view of a connecting portion of a safety inspection channel in the related arts.

As shown in FIG. 1, the shielding structure 1 is composed of two carbon fiber layers 100 and one rubber coating layer 200, each layer of which has a thickness of about 0.2 mm, totally having the thickness of about 0.6 mm. This shielding structure is thinner and has less influence on the imaging quality, but for occasions with wider beam surface, the shielding structure has un-satisfied rigidity and poor wear resistance.

And, as shown in FIG. 2, the shielding structure 1 has the uniform thickness, when the shielding structure 1 is connected with the adjacent channel structure 2, a pressing plate 3 and a supporting plate 4 are respectively arranged on inner and outer surfaces of the shielding structure 1, so that a step 5 is formed between the pressing plate 3 and the surface of the shielding structure 1. Dust or sundries are easily accumulated at the step 5, and thereby affecting imaging.

Figure 4:
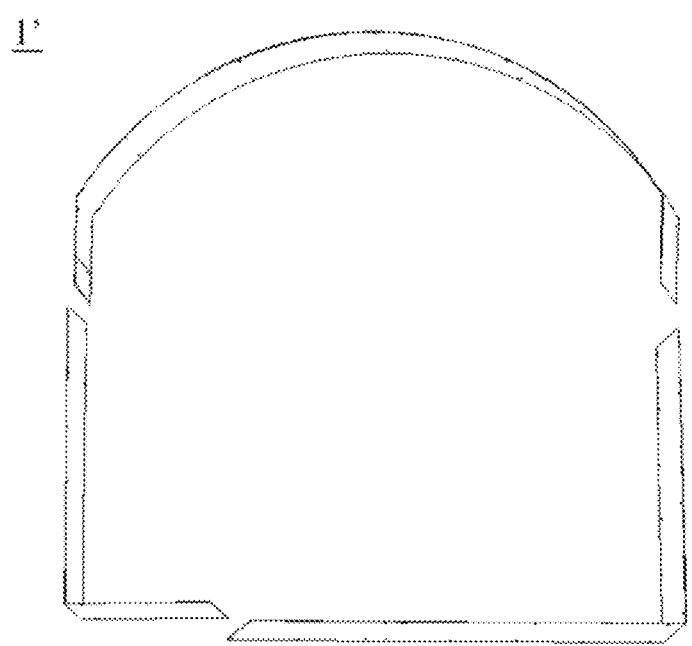
FIG. 4 is an exploded view of a shielding structure according to one embodiment of the present disclosure.
Figure 5:
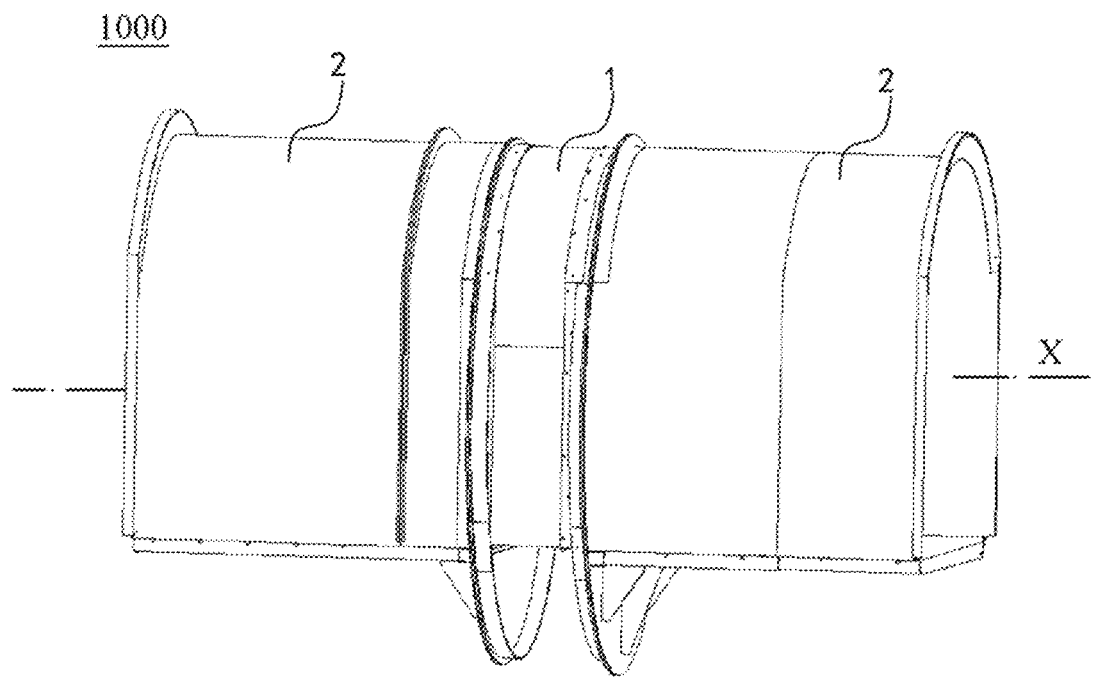
FIG. 5 is a perspective view of a safety inspection channel according to one embodiment of the present disclosure.

The present disclosure provides the shielding structure 1 of a safety inspection equipment. The shielding structure 1 and the channel structure 2 form a safety inspection channel 1000 (as shown in FIG. 5). Specifically, the shielding structure 1 is used for forming a shielding channel and the channel structures 2 are respectively connected and communicated with both ends of the shielding channel 1' (as shown in FIG. 4), so as to form a through safety inspection channel 1000. The safety inspection channel 1000 is mainly used in the safety inspection equipment of luggage. The safety inspection equipment is mainly used in occasions where safety inspection requirements for luggage are required. In the CT imaging system of the safety inspection equipment, the shielding structure has a simple structure, little influence on the imaging quality, light weight, durability and reliability, which are the key elements to affect the equipment imaging system.

Figure 3:
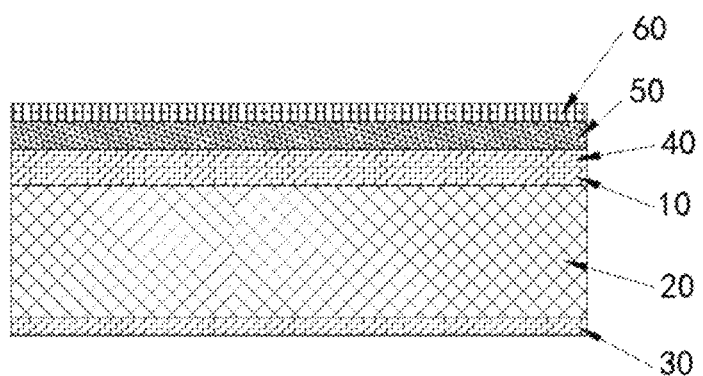
FIG. 3 is a schematic cross-sectional view of a shielding structure according to one embodiment of the present disclosure.

As shown in FIG. 3, the shielding structure 1 of the safety inspection equipment of the present disclosure includes a first carbon fiber layer 10, a polyurethane layer 20 and a second carbon fiber layer 30 sequentially stacked, to form a shielding channel 1' with both ends opened. Since the shielding structure 1 of the present disclosure is used for the safety inspection equipment, the shielding structure 1 is wholly constructed as a channel structure to cooperatively form a safety inspection channel 1000. The second carbon fiber layer 30 is an outer layer of the shielding channel 1'. The first carbon fiber layer 10 and the second carbon fiber layer 30 are made of carbon fiber materials, and the polyurethane layer 20 is made of polyurethane materials.

In the present disclosure, a polyurethane board layer (i.e., a polyurethane layer) is added between the two carbon fiber layers, since the carbon fiber layer has good strength, the carbon fiber layers are covered on the both sides of the polyurethane board to ensure the overall strength, so that the rigidity of the shielding structure can be improved. And the rigidity of the shielding structure has little influence on the imaging quality, so that the rigidity of the shielding structure can be improved while reducing the influence on the imaging quality. In addition, the polyurethane board layer has small density, so that the polyurethane board layer is lighter than the carbon fiber layer, and thus the total weight can be reduced. And, cost of the polyurethane board layer is low, thus reducing the overall cost.

And, an outer layer of the shielding channel 1' is a carbon fiber layer, for maintaining the strength of the shielding structure 1. The polyurethane layer 20 is wrapped by the two carbon fiber layers, so that slag and debris of the polyurethane layer 20 can be avoided.

Accordingly, compared with the existing carbon fiber shielding plate structure, the present disclosure can improve the multi-layer carbon fiber shielding plate structure, reduce the influence on the imaging quality, reduce the cost, and can improve the rigidity of the single-layer and double-layer carbon fiber shielding plate structures.

In this embodiment, as shown in FIG. 3, the shielding structure 1 may further include a third carbon fiber layer 40, which is stacked on one side of the first carbon fiber layer 10 away from the polyurethane layer 20. Wherein, there is one or more third carbon fiber layers 40.

By additionally arranging one or more third carbon fiber layers 40 on one side of the first carbon fiber layer 10, the strength of the shielding structure 1 can be improved, and thus an impact resistance of the shielding structure 1 can be improved. The number of the third carbon fiber layers 40 can be determined according to requirement for the strength in different occasions.

For example, in this embodiment, as shown in FIG. 3, one third carbon fiber layer 40 is provided. In other embodiments, more than one third carbon fiber layers 40 are provided, and are continuously stacked on one side of the first carbon fiber layer 10 away from the polyurethane layer 20.

In this embodiment, as shown in FIG. 3, the shielding structure 1 may further include an aramid fiber layer 50, which is stacked on one side of the third carbon fiber layer 40 away from the first carbon fiber layer 10. The aramid fiber layer 50 has a good abrasion resistance for improving the abrasion resistance of an inner surface of the shielding structure 1, and the aramid fiber layer 50 has little influence on CT imaging.

In this embodiment, as shown in FIG. 3, the shielding structure 1 may further include a rubber coating layer 60, which is stacked on one side of the aramid fiber layer 50 away from the third carbon fiber layer 40. The side of the rubber coating layer 60 away from the aramid fiber layer 50, which is used as a working surface for the surface of the product, has functions of decoration, weather resistance, crack prevention and the like, and plays a role of protection and decoration for a reinforcing layer, wherein the rubber coating layer 60 can be an improved resin.

Each of the first carbon fiber layer 10, the second carbon fiber layer 30 and the third carbon fiber layer 40 has a thickness of 0.2 to 0.4 mm, the polyurethane layer 20 has a thickness of 3 to 6 mm, and the aramid fiber layer 50 has a thickness of 0.3 to 0.5 ram.

In this embodiment, the thickness of the rubber coating layer 60 is 0.2 mm, the thickness of the aramid fiber layer 50 is 0.3 mm, the thicknesses of each of the first carbon fiber layer 10, the second carbon fiber layer 30 and the third carbon fiber layer 40 is 0.2 mm, the thickness of the polyurethane layer 20 is 5 mm, and the total thickness of the shielding structure 1, that is, a sum of the thicknesses of the all layers is about 6 mm. It should be understood that the thickness range is not limited thereto, and different values of the thickness can be selected according to different layers in different application occasions.

In this embodiment, as shown in FIG. 4, the shielding channel 1" is of a three-block structure, which has three joints respectively located at two side walls and a bottom of the shielding channel 1'. And the three-block structure has stable support and high strength.

Figure 8:
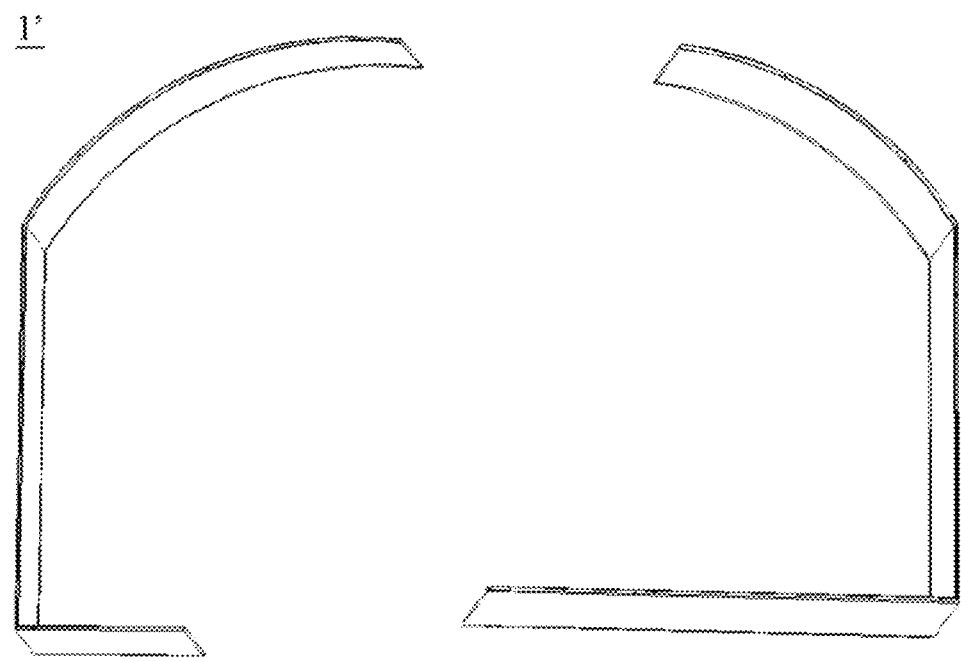
FIG. 8 is an exploded view of a shielding structure according to another embodiment of the present disclosure.

In another embodiment, as shown in FIG. 8, the shielding channel is of a two-half structure, which has two joints respectively located at the top and bottom portions of the shielding channel F. And the two-half structure is simple and easy to be assembled.

Figure 6:
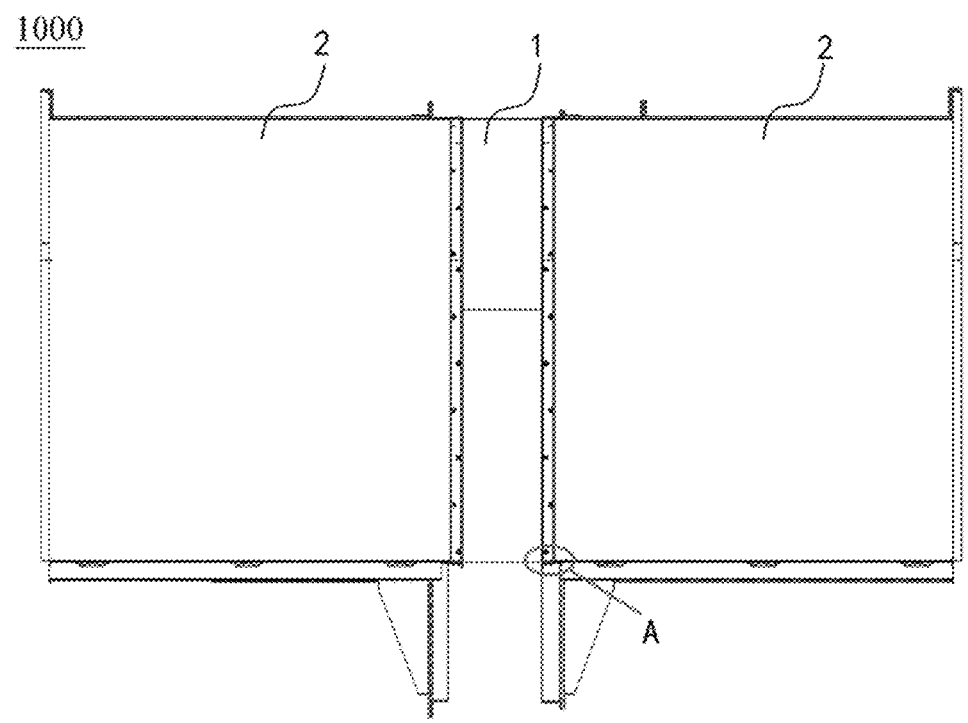
FIG. 6 is a side view of a safety inspection channel according to one embodiment of the present disclosure.
Figure 7:
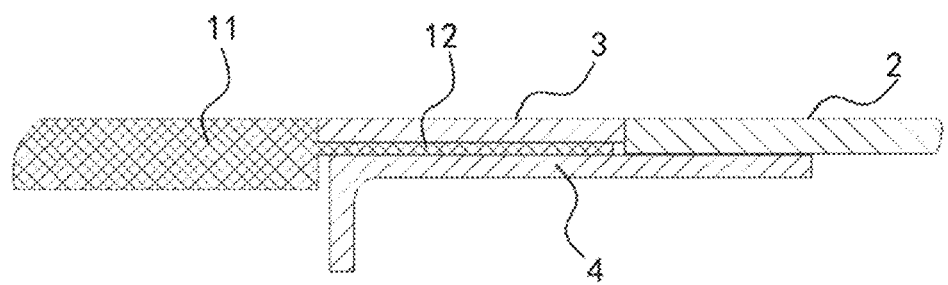
FIG. 7 is a sectional view of part A in FIG. 6.

In this embodiment, as shown in FIGS. 5-7, the shielding structure 1 includes a shielding body 11 and two extending portions 12 connected with both opposite ends of the shielding body. The extending portion 12 is connected with a portion between the outer surface and the inner surface of the shielding body 11 on both ends of the shielding body 11. The extending portion 12 extends along an axis x of the shielding passage 1' (the axis in this embodiment is an axis x in an extending direction of a safety inspection channel 1000, i.e., the axis x is parallel to a longitudinal direction of the safety inspection channel 1000 in FIG. 5), The thickness of the extending portion 12 smaller than the thickness of the shielding body 11, and the extending portion 12 is disposed between the outer surface and the inner surface of the shielding body 11. The safety inspection channel 1000 further includes a pressing plate 3 and a supporting plate 4. The pressing plate 3 is pressed on the outer surface of the extending portion 12 and closely adjacent to the shielding body 11 and the channel structure 2. The outer surface of the pressing plate 3 is flush with the outer surfaces of the shielding body 11 and the channel structure 2. The supporting plate 4 is arranged on the inner surfaces of the extending portion 12 and the channel structure 2, and is flush with the inner surfaces of the extending portion 12 and the channel structure 2. In one embodiment, the extending portion 12 is formed by extending an edge of the shielding body 11 (the extending portion 12 is formed continuously along the outer periphery of both ends of the shielding body 11). The extending portion 12 is structurally different from the shielding body 11 in that the polyurethane layer in the shielding structure 1 is not contained in the extending portion 12. That is to say, the extending portion 12 is formed by pressing an extending portion of the fiber layer (which may also include a rubber coating layer) of the shielding body 11. The extending portion 12 is configured to reduce the thickness of the edge of the shielding structure 1, and furthermore, the extending portion 12 can be provided between the pressing plate 3 and the supporting plate 4, so that the shielding structure 1 can be installed in the safety inspection channel 1000. As shown in FIG. 7, by optimizing the shielding structure 1, the outer surfaces of the shielding structure 1, the pressing plate 3, and the channel structure 2 are flush, to avoid steps at a junction of the pressing plate 3 and the shielding structure 1, and to avoid accumulating dusts or sundries at the steps.

As above described, a polyurethane board layer is added between the two carbon fiber layers in the present disclosure, since the carbon fiber layer has good strength, the carbon fiber layers are covered on the both sides of the polyurethane board to ensure the overall strength, so that the rigidity of the shielding structure can be improved. And the rigidity of the shielding structure has little influence on the imaging quality, so that the rigidity of the shielding structure can be improved while reducing the influence on the imaging quality. In addition, the polyurethane board layer has small density, so that the polyurethane board layer is lighter than the carbon fiber layer, and thus the total weight can be reduced. And, cost of the polyurethane board layer is low, thus reducing the overall cost.

And, the outer layer of the shielding channel 1' is a carbon fiber layer, for maintaining the strength of the shielding structure 1. The polyurethane layer 20 is wrapped by the two carbon fiber layers 10 and 30, so that the slag and debris of the polyurethane layer 20 can be avoided.

Accordingly, compared with the existing carbon fiber shielding plate structure, the present disclosure can improve the multi-layer carbon fiber shielding plate structure, reduce the influence on the imaging quality, reduce the cost, and can improve the rigidity of the single-layer and double-layer carbon fiber shielding plate structures.

Exemplary embodiments of the present disclosure have been particularly shown and described above. It should be understood that the present disclosure is not limited to the disclosed embodiments. Rather, various modifications and equivalent arrangements within the spirit and scope of the appended claims are intended to be contained.

Although the present disclosure has been described with reference to a few of typical embodiments, it should be understood that all the terms used are illustrative and exemplary, and nonrestrictive. As the present disclosure may be embodied in a variety of forms without departing from the spirit or scope of the invention, it is to be understood that the above-described embodiments are not limited to any foregoing detail. All changes and modifications within the scope of the claims or their equivalents are intended to be embraced by the appended claims.

The invention claimed is:

1. A shielding structure of a safety inspection equipment comprising a shielding body, wherein the shielding body comprises a first carbon fiber layer, a polyurethane layer and a second carbon fiber layer sequentially stacked to be configured as a shielding channel with two opened ends, wherein the second carbon fiber layer is an outer layer of the shielding channel, the first carbon fiber layer and the second carbon fiber layer are made of carbon fiber materials, and the polyurethane layer is made of polyurethane materials,
wherein the shielding channel is a three-block structure, having three joints respectively located at two side walls and a bottom portion of the shielding channel.

2. The shielding structure of the safety inspection equipment according to claim 1, wherein the shielding structure further comprises a third carbon fiber layer stacked on one side of the first carbon fiber layer away from the polyurethane layer.

3. The shielding structure of the safety inspection equipment according to claim 2, wherein number of the third carbon fiber layers is one or more layers.

4. The shielding structure of the safety inspection equipment according to claim 2, wherein the third carbon fiber layer comprises a plurality of carbon layers, which are continuously stacked on one side of the first carbon fiber layer away from the polyurethane layer.

5. The shielding structure of the safety inspection device according to claim 3, wherein the shielding structure further comprises an aramid fiber layer stacked on one side of the third carbon fiber layer away from the first carbon fiber layer.

6. The shielding structure of the safety inspection device according to claim 5, wherein the shielding structure further comprises a rubber coating layer stacked on one side of the aramid fiber layer away from the third carbon fiber layer.

7. The shielding structure of safety inspection equipment according to claim 5, wherein a thickness of each of the first carbon fiber layer, the second carbon fiber layer and the third carbon fiber layer is 0.2-0.4 mm, a thickness of the polyurethane layer is 3-6 mm, and a thickness of the aramid fiber layer is 0.3-0.5 mm.

8. The shielding structure of the safety inspection device according to claim 1, further comprising two extending portions connected with both opposite ends of the shielding body, wherein the extending portions extend along an axis of the shielding channel.

9. The shielding structure of the safety inspection device according to claim 8, wherein the extending portions are formed by extending along the axis and pressing the first fiber layer and the second fiber layer on both sides of the polyurethane layer of the shielding body.

10. The shielding structure of the safety inspection device according to claim 8, wherein a thickness of the extending portions is smaller than a thickness of the shielding body, the extending portions are disposed between an outer surface and an inner surface of the shielding body.

11. The shielding structure of the safety inspection device according to claim 9, wherein the shielding structure further comprises a third carbon fiber layer stacked on one side of the first carbon fiber layer away from the polyurethane layer, the extending portions are formed by extending along the axis and pressing the first fiber, the second fiber layer and the third carbon fiber layer.

12. The shielding structure of the safety inspection device according to claim 9, wherein the shielding structure further comprises a third carbon fiber layer stacked on one side of the first carbon fiber layer away from the polyurethane layer and an aramid fiber layer stacked on one side of the third carbon fiber layer away from the first carbon fiber layer, the extending portions are formed by extending along the axis and pressing the first fiber, the second fiber layer, the third carbon fiber layer and the aramid fiber layer.

13. A safety inspection channel of a safety inspection equipment, comprising two channel structures and a shielding structure according to claim 1, wherein the two channel structures are respectively connected and communicated with both ends of the shielding channel formed by the shielding structure, to form a through safety inspection channel.

14. The safety inspection channel of the safety inspection equipment according to claim 13, further comprising two extending portions connected with both opposite ends of the shielding body, wherein the extending portions extend along an axis of the shielding channel.

15. The safety inspection channel of the safety inspection equipment according to claim 14, wherein a thickness of the extending portions of the shielding structure is smaller than a thickness of the shielding body of the shielding structure; the safety inspection channel further comprises a pressing plate and a supporting plate, the pressing plate is pressed on an outer surface of the extending portions, and closely adjacent to the shielding body and the channel structure; an outer surface of the pressing plate is flush with outer surfaces of the shielding body and the channel structure, and the supporting plate is provided on inner surfaces of the extending portions and the channel structure and flush with inner surfaces of the extending portions and the channel structure.

16. The safety inspection channel of the safety inspection equipment according to claim 14, wherein the extending portions are continuously formed along outer peripheries of both ends of the shielding body.

* * * * *